US012743705B2

(12) United States Patent
Van Der Zwan et al.

(10) Patent No.: US 12,743,705 B2
(45) Date of Patent: Sep. 22, 2026

(54) CONSTRUCTION SITE INSPECTION DOCUMENTATION METHOD AND SYSTEM

(71) Applicant: HEXAGON INNOVATION HUB GMBH, Heerbrugg (CH)

(72) Inventors: Elmar Vincent Van Der Zwan, Walzenhausen (CH); Thomas Ziegler, Zürich (CH); Muyan Xiao, Zürich (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 0 days.

(21) Appl. No.: 18/974,271

(22) Filed: Dec. 9, 2024

(65) Prior Publication Data

US 2025/0378450 A1 Dec. 11, 2025

(30) Foreign Application Priority Data

Dec. 13, 2023 (EP) .................................... 23216445

(51) Int. Cl.
*G06Q 30/018* (2023.01)
*G06Q 50/08* (2012.01)

(52) U.S. Cl.
CPC .......... *G06Q 30/018* (2013.01); *G06Q 50/08* (2013.01)

(58) Field of Classification Search
CPC ............................ G06Q 30/018; G06Q 50/08
See application file for complete search history.

(56) References Cited

U.S. PATENT DOCUMENTS

2020/0077379 A1* 3/2020 Miller ................ H04W 72/044
2021/0326495 A1* 10/2021 Motahar ............. G06Q 10/063
2025/0022076 A1* 1/2025 Furlani ............... G06Q 20/389

FOREIGN PATENT DOCUMENTS

EP 3 222 969 A1 9/2017
EP 3 614 101 A1 2/2020
EP 3 779 357 A1 2/2021

(Continued)

OTHER PUBLICATIONS

Herath, S. et al., "Fusion-DHL: WiFi, IMU, and Floorplan Fusion for Dense History of Locations in Indoor Environments," arxiv.org, (2021).

(Continued)

*Primary Examiner* — Jessica Lemieux
*Assistant Examiner* — Alaa Wadie Hussein
(74) *Attorney, Agent, or Firm* — Maschoff Brennan

(57) ABSTRACT

A method and system for construction inspection documentation with an inspection device moved at the construction along a trajectory, whilst capturing multiple inspection data sets. Thereby, there is automatically extracting first trajectory shape- and/or time-related attributes by evaluation of a shape and/or a timeline of the trajectory, automatically correlating extracted first attributes with corresponding second construction attributes provided by a stored construction plan or model, automatically aligning, and preferably also scaling, the trajectory using the construction plan or model as positional reference based on correlated first and second attributes. This enables automatically allocating a respective inspection data set to a position within the construction plan or model based on the aligned and scaled trajectory.

20 Claims, 4 Drawing Sheets

(56) References Cited

FOREIGN PATENT DOCUMENTS

| | | | |
|---|---|---|---|
| WO | 2015/041689 | A1 | 3/2015 |
| WO | 2019/018315 | A1 | 1/2019 |

OTHER PUBLICATIONS

Aitken, J.M. et al., "Simultaneous Localization and Mapping for Inspection Robots in Water and Sewer Pipe Networks: A Review," IEEE Access, vol. 9, pp. 140173-140198 (2021).

Extended European Search Report dated Jun. 7, 2024 as received in Application No. 23216445.9.

* cited by examiner

CONSTRUCTION SITE INSPECTION DOCUMENTATION METHOD AND SYSTEM

SUMMARY

The disclosure relates to a method and system for generation of an inspection documentation of a construction site according to the independent claims.

Construction inspection systems and instruments which provide an inspection documentation of a construction or on a construction site are used for construction evaluation, e.g., document an actual condition of a construction after impacts such as earthquakes or because of deterioration by aging, or verification of accurate or timely construction or in order to document aspects of the construction process for later reference of huge or spacious constructions. Exemplary large constructions are buildings (buildings is to be understood as a broad term, including houses, factory buildings, streets, bridges or tunnels, etc.), ships or aircrafts, etc., or industrial installations, i.e., to acquire as-built data which can be compared to target construction data as for instance laid out in a plan or model of the construction such as a two or three dimensional plan or CAD-drawing.

For example, at a construction site, a variety of tasks are performed simultaneously on different parts of a construction project, and it is difficult to keep track of progress for each aspect of the construction project to determine whether the project is on track to being completed on time. There is the demand to monitor progress on the construction site, in particular recurrently as the construction evolves, by capturing inspection data sets such as images (including also videos) of the construction site that documents conditions of the construction site. Also, interior construction sites are regularly inspected, e.g., the interior of a building is inspected by designers like architects, glaziers, tilers or staircase builders, e.g., for as-built data capture.

For inspection, the inspection device is moved by a user or vehicle at, e.g., around or within in the construction, e.g., as a so-called walk-through, whilst inspection data, such as 2D- or 3D-images of the construction, is gathered along the movement trajectory which data provides the inspection documentation. For example, a user walks through a construction site with a 360°-camera to generate a "virtual" visual tour as construction documentation of the construction.

To associate a respective construction inspection data set with the accordingly planned building data, a location at which a data set was acquired is needed. For example, the user takes a large number of pictures of the construction and to be able to find relevant pictures later, the pictures need to be stored with their referenced location at the construction or construction site.

An association in a building plan coordinate system can be done manually by position logging by the user. For example, a user manually annotates each inspection image as an example of a data set with its respective location within a construction site. This is time-consuming and cumbersome. Furthermore, the accuracy of the inspection locations depends on the accuracy of the user input.

As an alternative, a respective inspection location can be determined using position or movement sensors on board the inspection device, i.e., an automatic position logging for example based on GNSS sensor data (which however is not feasible everywhere, in particular not indoors), image-based localization, for instance using Simultaneous Localization And Mapping (SLAM) algorithms, or dead reckoning, for example using an Inertial Measurement Unit (IMU). Such position and/or orientation determining means can record a 2D- or 3D-trajectory of the inspection in a time-synchronized manner with the capturing of inspection data and instances or sets of inspection data can be allocated within the trajectory using timestamps. However, inspection positions derived therewith are referring to an internal reference system of the instrument or sensor and need to be transformed to the external coordinate system of a construction plan. Such reference frame or coordinate transformation usually is done manually, for example by manual association of at least two trajectory points to two corresponding positions of a building plan or model, which still is time-consuming and cumbersome and may lack accuracy.

SUMMARY

It is therefore an object of the present disclosure to provide an improved method and system for generation of an inspection documentation of a construction.

A further object of the present disclosure is to provide a method and system for automatic position-true generation of a construction inspection documentation.

The disclosure relates to a method for generating an inspection documentation of a construction, using a model or plan of the construction.

The method comprises the steps of moving an inspection device at the construction such that a moving trajectory develops or grows, whilst continuously or recurrently/from time to time capturing multiple inspection data sets such as images of at least part of the construction at positions along the trajectory. The trajectory of the moving is recorded or determined based on motion and/or location data of the inspection device gathered on board resp. by a sensor of the inspection device whilst moving and allocating, e.g., using time stamps, a respective captured data set to a point or position of or along the trajectory.

The method comprises further an automatic extraction of first trajectory shape- and/or time-related attributes by evaluation of a shape and/or a timeline of the trajectory. Further, there is automatically correlating extracted first trajectory attributes with corresponding second construction plan or model attributes provided by a stored construction plan or model.

Based on correlated first and second attributes, there is the step of automatically aligning, and optionally also scaling, the trajectory using the construction plan or model as positional reference which enables automatic allocating a respective inspection data set to a position or point within the construction plan or model based on the aligned and optionally also scaled trajectory.

Optionally, the trajectory is automatically corrected, in particular in course of the aligning and scaling, by adding, cutting and/or shifting trajectory points and/or trajectory segments based on constraints derived from the construction model or plan and/or derived from the trajectory. Such constraints are optionally linked to attributes.

In a further development of the method, the first attributes comprise sections of the trajectory which are classified according to shape and/or motion classes in course of the attribute extraction or in other words, the first attributes are extracted according to pre-determined different classes of trajectory shape sections/parts and/or trajectory motion sections/parts.

Optionally, the second attributes comprise different classes of construction sections such as installations or facilities, therein at least a class of spaces or rooms, in particular differentiated according to size and/function, and/ or a class of locations and/or dimensions of barriers or obstructions, in particular walls and/or fences, or a class of openings of a construction or construction site.

As another option, first and/or second attributes comprise patterns of shapes and/or motion patterns, patterns of construction site sections, and/or a graph representation. Such patterns are optionally derived from an association to an—above mentioned—respective class. As another option, there is a weighting of constraints depending on an—above mentioned—first and/or second attribute class.

In another further development, there is a weighting of a first attribute and/or a trajectory point and/or segment depending on an associated timestamp. Such weighting is in particular applied for attribute extraction, trajectory alignment and/or scaling and/or trajectory correction.

For said automatic aligning and/or scaling, motion and/or location data of the inspection device is optionally considered. As another option, a previous inspection documentation trajectory of the construction is taken into account when aligning and/or scaling.

Alternatively or additionally, at least one previous image of the construction site is considered for the alignment and/or scaling. For example, one (or more) older documentation trajectory and/or image is compared to the recent trajectory or recent images of the construction taken along the recent trajectory.

Optionally, the first attributes are extracted from the trajectory using a first machine learned algorithm, in particular for class-related extraction, for example the algorithm comprising a first neural network. As another option, the second attributes are extracted from the construction plan or model using a second machine learned algorithm, in particular comprising a second, specifically deep learning, neural network. Preferred examples for neural networks are deep learning neural networks. A neural network, in particular a graph neural network, can also be used for correlating first and second attributes.

Optionally, the extracting of first attributes is based on a 2D-planar presentation of the trajectory, which 2D-data of the trajectory may be derived from 3D-trajectory data in course of the method. As another option, the constructions plan or model is embodied as a 2D- or 3D-construction and/or building plan, such as a floorplan and/or (derived from) a Building Information Model (BIM).

As another option, the inspection device comprises an opto-electronic 2D- and/or 3D-imaging device and the data sets comprise 2D- and/or 3D-images. Thereby, the motion and/or location data can comprise at least part of such 2D-images which are used for visual odometry/SLAM.

As some embodiments, there is verifying of the automatic aligning and scaling by a human supervisor, wherefore a graphical representation of the aligned and scaled trajectory as an overlay to a graphical representation of the construction site model is generated and displayed and/or automatically, in particular using signed distance fields, said verification executed preferably before the allocating of inspection data sets.

The present disclosure also relates to a construction inspection system for generating a construction inspection documentation. The system comprises a movable inspection device having motion and/or location detection means for recording a movement trajectory of the device and inspection means for capturing inspection data sets of at least part of the construction at positions along the trajectory. Further, the system has an evaluation unit configured to allocate a respective captured data set to the position of the trajectory, in particular the allocation being based on time stamps.

The evaluation unit is configured to extract first trajectory shape- and/or time-related attributes by evaluation of a shape and/or a timeline of the trajectory, to correlate extracted first construction site attributes with corresponding second construction site model attributes provided by a stored construction plan or model, to align and optionally also scale the trajectory using the construction plan or model as positional reference based on correlated first and second attributes and to allocate a respective inspection data set to a position within the construction plan or model based on the aligned and optionally also scaled trajectory.

The present disclosure also relates to a computer program product comprising program code which is stored on a machine-readable medium, or being embodied by an electromagnetic wave comprising a program code segment, and having computer-executable instructions for performing, particularly when executed on a computing unit of a system as claimed, the method as claimed.

The disclosure provides the advantage to perform construction documentation without the need for user input concerning the localization of inspection data sets such as images in a construction plan or model, but making use of geometric and/or time related characteristics of the inspection trajectory and corresponding or associable characteristics of the construction under inspection, thereby making the construction documentation process faster and more accurate.

BRIEF DESCRIPTION OF THE DRAWINGS

Devices, methods, systems, setups and computer programs are described or explained in more detail below, purely by way of example, with reference to working examples shown schematically in the drawing. Specifically, FIGS. 1*a,b* schematically shows an exemplary embodiment of an inspection system for inspection of a construction as known in the art.

DETAILED DESCRIPTION

Figures 1A, 1B:
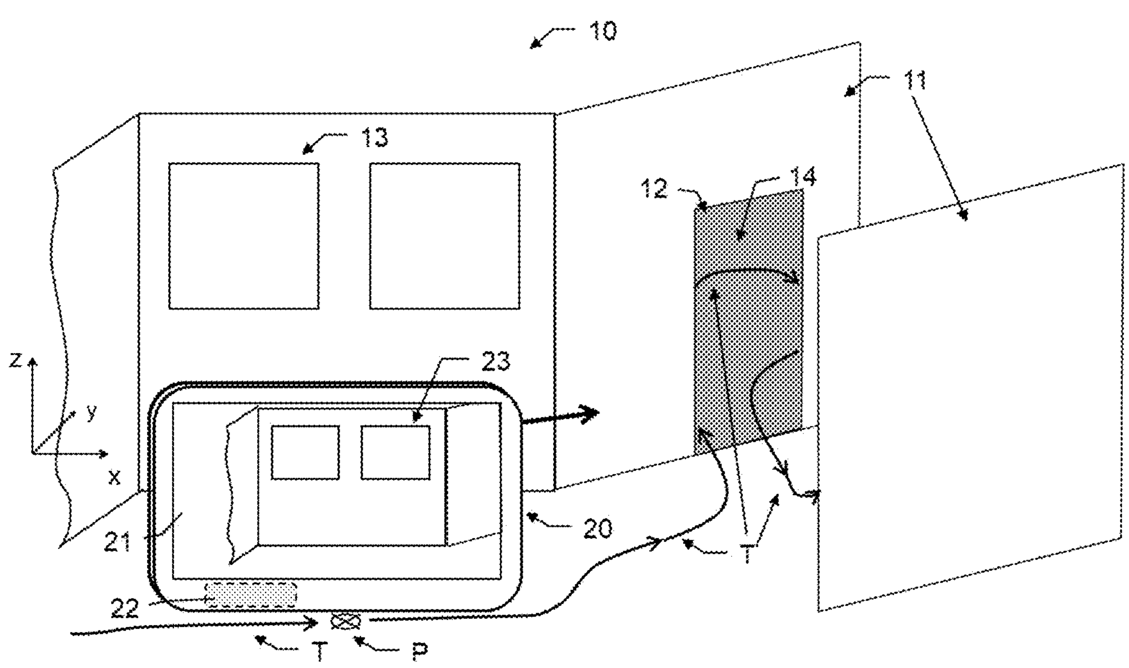

FIGS. 1*a,b* schematically show an exemplary embodiment of an inspection system for inspection of a construction 10 as known in the art. FIG. 1*a* is a 3D-scheme, whereas FIG. 1*b* basically is a 2D-top-view. The exemplary depicted construction 10 is a building under construction or more specifically, a building floor. The building interior comprises different building elements such as walls 11, doors or door openings 12 or windows 13 and rooms or halls/corridors 14.

The inspection system comprises an electronic camera device 20 with a display 21 as an exemplary inspection device for capturing images 23 of the construction resp. construction site 10 as example of inspection data sets (whereby a single image or multiple images together, e.g. as part of a video, is understood as a data set). The inspection device 20 can also comprise a depth camera, like a time of flight camera, a stereo camera, a range image camera, a laser scanning or profiling unit, a structured light 3D scanner, etc., as alternative examples of inspections means; and according examples of an inspection data set are one or more spatial or 3D-points, e.g., in form of a point cloud or a 3D-/depth image. Besides or in addition to opto-electronic inspection means, also other sensors or detectors feasible for construction inspection can be used, e.g., eddy current sensors or other non-destructive sensing means.

In the example, a user 100 holds the imaging device 20 and walks through the building 10 from a starting point P' which point in the example is also the end point of the evolving movement trajectory T of the user 100 resp. the imaging device 20. In the example, the user 100 walks through all rooms 14 of the floor and records inspection data meanwhile. For example, the user 100 collects inspection data sets by capturing one or more video streams while walking and taking still images, e.g., with a 360°, panorama or depth camera at distinct points P, for instance in order to cover in particular relevant construction sections, installations or features such as windows 13 or some rooms 14, in more detail.

The system comprises means, such as a position or motion sensor 22, for recording the trajectory T and allocating inspection data sets to the position along the trajectory T at which the data set is acquired (and often also an orientation or viewing/sensing/measuring direction of the inspection device 20 when acquiring the inspection data). Allocation of data sets can for example be based on time stamps resp. time synchronization of inspection means and position determination means 22. For instance, based on the time stamps, any camera image or any inspection data can be located on the trajectory T.

As known in the art, such motion and/or position recording resp. (continuous) determination of position of the inspection device 20 can be deduced from data of a navigation system like a navigation satellite system (GNSS) and/or of a base station local navigation.

If no navigation system is available, e.g., for indoor inspection or at narrow or shadowed outdoor construction sites, or as additional or auxiliary position/motion sensing means, the inspection device 20 comprises motion and/or position sensors 22 such as an accelerometer, a gyroscope, or a solid state compass. A preferred example is an Inertial Measurement Unit (IMU) which provides measurements for accelerations and angular rates that are integrated to derive velocity in a first step and finally position and orientation of the device 20.

The deriving of the location information can in particular comprise sensor fusion of multiple of such units which can be configured to derive positional or navigation information, e.g., also to overcome instances when one or more of the multiple sensors 22 is blocked or has insufficient data.

As another example of position or motion sensing means and in particular in case of an imaging inspection device 20 as exemplified, the trajectory T can be recorded visually, e.g., using visual odometry, structure-from-motion, Simultaneous Localization and Mapping (SLAM), LIDAR-simultaneous localization and mapping, or dense matching algorithms.

Spatial reference information can also be derived by a Visual SLAM method. Visual SLAM (or VSLAM) basically is a repetitive application of resection and forward-intersection with an optional bundle-adjustment at the very end and allows capturing optical inspection data of an environment while simultaneously keeping track of the camera unit's location and orientation within it. The spatial reference information allows deriving location information for the field of view of the camera image. Visual SLAM is evaluating the images from the camera device 20.

In Visual SLAM, the feature tracking is detecting object features/point features, or so-called landmarks, in an image stream and tracks their position from one image frame to the next. Now, when the camera moves in a construction (site), the detected features, e.g., the corners of walls 11, or the door 12 or the windows 13, will then move in an image 23, e.g., when the camera is rotating from left to right the features on the image would then move to the right and to the left. If there is a system with several cameras, the features can also move from one camera field of view to the field of view of another camera during rotation. Hence, from the movement of the object features between the frames of the image stream or the appearance of the features in different camera fields of view, the direction of motion of the camera in 3D-space can be deduced.

In a continuous process, an algorithm computes the 3D-coordinates (mapping) of the tracked features from two or more positions and uses these coordinates for the determination of the following position (localisation). The generated map of landmarks is evolving as the operator 100 resp. the device 20 moves along this track or trajectory T and acts as a reference for the whole positioning algorithm.

VSLAM can be further improved by adding data of an IMU. Such Visual Inertial Systems (VIS), also known as Visual-Inertial SLAM (VI-SLAM) or Visual-Inertial Localization, combines visual and inertial odometry by fusing camera and IMU data and typically is either filtering-based or optimization-based. Thereby for example, the IMU data can be fused only to estimate the orientation and possible the change in position, but not the full pose. As an alternative, the state of the camera and IMU together can be fused into a motion and observation equation, with subsequent state estimation.

Thus, whatever position resp. motion determining means used, the trajectory T which describes the movement of the inspection device 20 can be recorded and the location of inspection data sets determined.

However, this trajectory T is available in a sensor space or internal reference system only and is not referenced to a construction plan or model and localization on the trajectory T does not yet provide a localization in the construction plan or model. Seen otherwise, an inspection documentation with as-built data has to be linked in a position true manner to reference data in form of construction plan or model with target data. For example, to be able to find the relevant pictures 23 as inspection data sets later, the pictures 23 need to be stored with their location within a construction or construction site.

In addition, since position measurements are affected by measurement errors, the recorded trajectory T is prone to position error. In particular in case of applying an IMU resp. dead reckoning, integration leads to a significant drift of the derived quantities. The longer the trajectory 3, the greater a deviation between recorded data and "true" data can become.

FIGS. **2*a,b* illustrate schematically an example of evaluation of an inspection trajectory T for providing a localization in a construction plan or model 15**, both schematically in a 2D-top view.

The inspection trajectory T generated as exemplified above is automatically analyzed by an evaluation unit of the inspection system, e.g., a computer unit of an inspection device or a connected or back-office computer. Goal of the evaluation is to extract attributes 1, 2, **2*a*, 2', 3, 4, 4*a*, 4' of the trajectory T, denoted first attributes, and to provide attributes 11*a*, 12*a*, 12*a*', 13*a*, 14*a*, 14*a*' of the construction model 15, denoted second attributes, i.e., prominent features of both the trajectory T and the construction plan 15 which can be correlated to another. Then based on the correlation, the trajectory T is aligned and scaled with the plan or model 15 as reference, thereby allocating inspection data sets to the construction model 15**.

In the example, a trajectory attribute (or first attribute) is extracted based on the shape or part of the shape (shape segments) of the trajectory T. Examples are loops 4 and 4'. Such shape patterns 4, 4' are typical for inspection of rooms (along a corridor).

Rooms are an example of a model or second attribute 14*a*, 14*a*' that are provided by the model 15. Such attributes can be stored together with the model 15, hence, be already given. Otherwise, some or all second attributes 11*a*, 12*a*, 12*a*', 13*a*, 14*a*, 14*a*' are extracted by an evaluation algorithm from a given model 15.

In any case, rooms such as denoted rooms 14*a*, 14*a*' are recognized as model features. As said trajectory shapes 4, 4' are considered being caused by inspection of rooms, the first attributes 4, 4' are correlated to said second attributes 14*a*, 14*a*'. A correlation is indicated in the figure by a broad, long double arrow. Said otherwise, such loop-like trajectory shape sections 4, 4' are seen as corresponding to rooms 14*a*, 14*a*', in particular to rooms 14*a*, 14*a*' with only one or one main entrance.

Thereby, also dimensions such as a diameter or length of attributes can be determined and taken into account to distinguish between different size of a same type or class of attribute, e.g., to differentiate between rooms 14*a*, 14*a*' and according shapes 4, 4' of different size.

Further depicted examples of second attributes are openings 12*a*, 12*a*'. Such transit sections of a construction typically lead to an inspection movement with narrow trajectory sections as indicated in the figure by arrows 2 or 2'. Also, a distance between adjacent trajectory sections or points can be considered as indicated by arrows 2*a*. Such trajectory attributes 2, 2', 2*a* hence can be correlated to an opening 12*a* or 12*a*'. Besides pure shape, also a time related information can be attributed here in that a movement direction is considered, i.e., the anti-parallel movement direction as indicated by arrows 2.

Attributes can also be combined or aggregated or formed from multiple aspects of the trajectory T or can be correlated to more than one "counterpart"-attribute (first to second attribute correlation). For example, correlation to a second attribute (class) "room" 14*a*, 14*a*' can be done by first attribute(s) of "loop" 4 and neck 2 evaluated together, e.g., in form of a first and second input to a correlation algorithm such as a neural network, or classifying such a shape section 4+2*a* as a bulge.

As already mentioned, also time-related trajectory features can serve as attributes or attribute components. For example, a movement direction and/or velocity (pattern) as indicated by arrow 1 can be used as a trajectory side attribute. As the inspectional movement at trajectory section 1 is relatively straight, this straight path is correlated to a path obstruction, in this case a wall 11*a*. Other such second attributes 11*a* which constrain an inspection path and thus lead to typical trajectory sections 1 could be a fence or natural obstacles which usually are also imaged in an outdoor construction (site) plan such as a river or trench.

In other words, an indoor construction environment such as a building is typically divided in different rooms by walls. Attributes which can be applied in that case are things like the location of doors and the size of rooms. In an outdoor environment, natural barriers like rivers and man-made structures such as roads or fences divide the space and give rise to patterns in the camera trajectory T that can be aligned with accordingly modelled attributes of the environment.

Also points of stand-still 4*a*, 3 can be used as attributes. For instance, point 4*a* can be indicated of a room 14*a*, 14*a*' (e.g., in case if imaging inspection, here a 360° image of a room is taken) or point 3 can be indicative of a construction detail such as a cornered edge or window or openings 13*a* or a particular installation such as an electric installation or pipe knot which demands more or particular inspection time, e.g., when using an inspection device having an eddy current sensor. Hence, first attribute "stand-still point" 3 is correlated in the example to second attribute "installation (point)".

For detecting attributes or distinctive patterns of the trajectory T, Neural Networks can be employed such as Convolutional Neural Networks (CNNs), Long Short-Term Memory networks (LSTMs) or other Recurrent Neural Networks (RNNs). Such patterns are (but not restricted to) corridors, small/large rooms or standing-still (capturing) locations. The trajectory T might also be utilized as a time-series in the network to detect patterns such as stand-still locations.

The neural network classifies sections of the trajectory T into different classes. Furthermore, a graph representation of the trajectory T can be created, linking the different classes. Independently a similar graph representation of the corresponding distinctive patterns can be extracted from the construction site model 15 using a different network. A correspondence between the two graphs can then be established using e.g., a graph neural network.

Figure 2A:
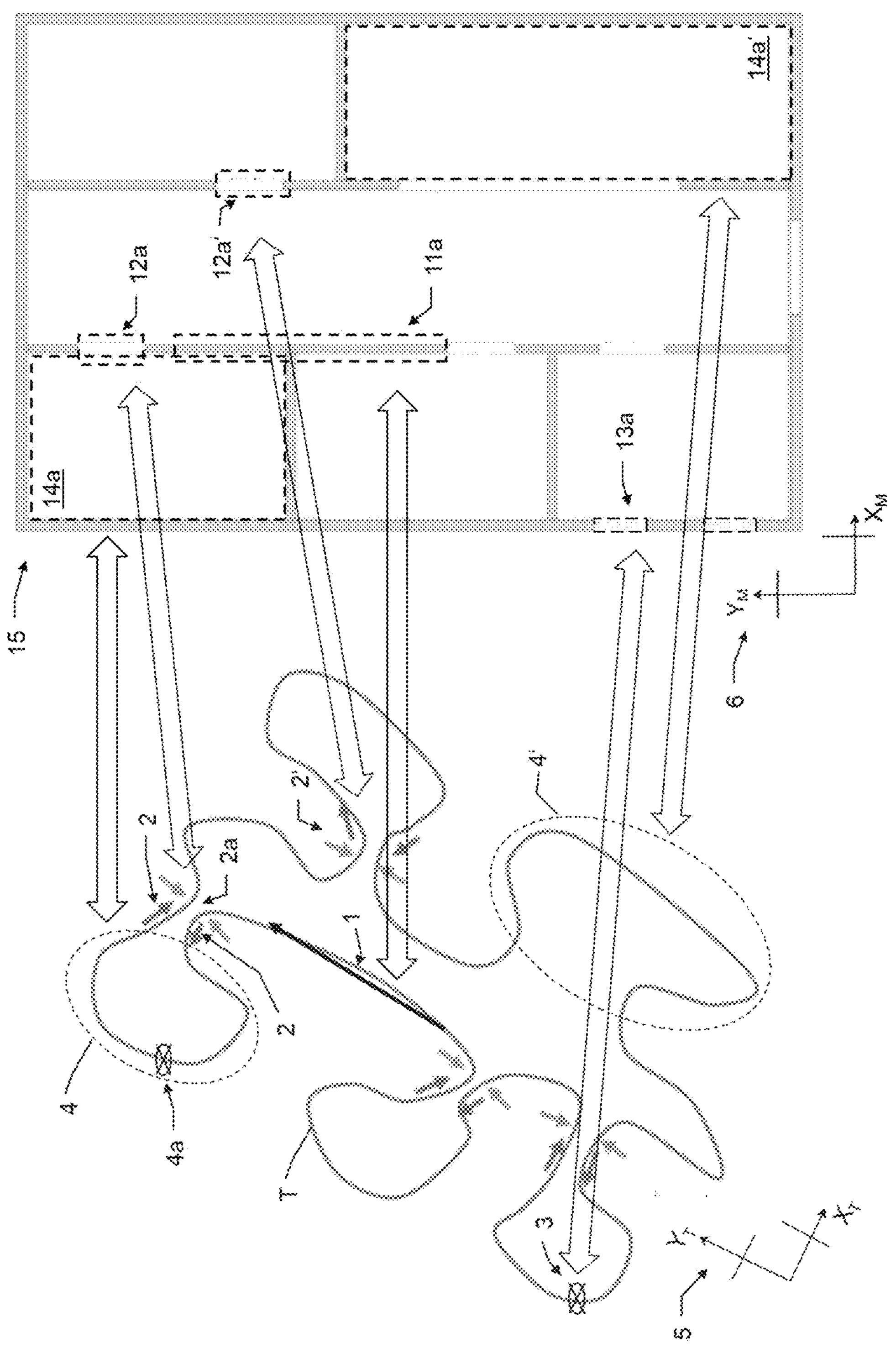
FIGS. 2*a,b* schematically show an example of evaluation of an inspection trajectory for providing a localization in a construction plan or model in 2D-top views.

Based on the correspondence between the two graphs, one or several potential alignments (transformations) can be estimated. This is schematically indicated in the figures in that FIG. 2*a* shows trajectory T and a trajectory reference system 5 having different orientation and scale compared to the construction model system 6 before the transformation where the trajectory T is not yet referenced to the floorplan 15.

Figure 2B:
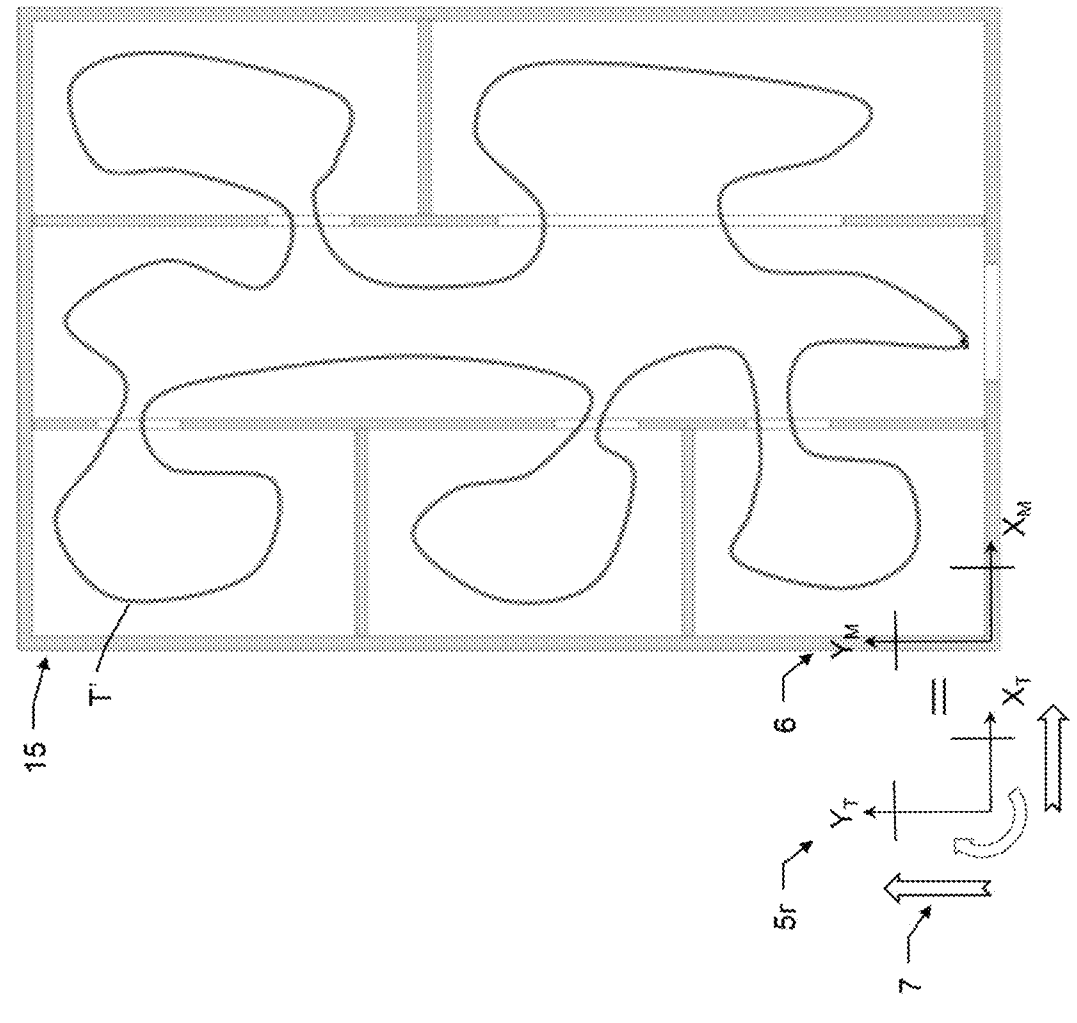

FIG. 2*b* shows the result when the established correspondence of first and second attributes has been used to align and scale the trajectory T to the construction model M. Schematically this is depicted in that trajectory T' fits into the plan 15 after rotating and scaling (indicated by arrows 7) and the rectified trajectory reference system 5*r* now equals the construction model system 6 in orientation and scale.

To summarize, an algorithm automatically aligns the inspection trajectory T to the construction site model 15 based on correspondences between trajectory attributes and model attributes. The algorithm can for example be a machine-learning algorithm, specifically, a deep-learning algorithm. The inputs are the trajectory T in sensor space and the construction site model (or models) 15, and the output is the trajectory T' scaled and positioned on the construction site model 15, e.g., floor plan. The algorithm uses the trajectory shape and/or time-series features 1, 2, 2*a*, 2', 3, 4, 4*a*, 4' and attributes 11*a*, 12*a*, 12*a*', 13*a*, 14*a*, 14*a*' of the construction (model), e.g., building corridors, doors and room sizes to perform the alignment 7.

Thereby, an evaluation might take advantage of the fact, that, in order to have consistency between different construction sites and different users and to guarantee useful documentation data is recorded, typically a user will follow a set of rules on how to move through a construction site for inspection. Example of such rules are to enter rooms on the left-hand side of a corridor before entering rooms on the right-hand side of a corridor. Another example is to take pictures of all the walls in a room from an appropriate distance or to stand in the middle of any room with a 360°-camera to get an overview shot. Such parameters can be taken into account for shaping or learning attributes or defining/learning attribute classes or as constraints for trajectory alignment or scaling or correction of such alignment or scaling.

Other examples of additional parameters or constraints are geometry clues (distances, scales) which can be used for the alignment 7, in particular if the inspection data sets comprise such distance information, e.g., when the inspection device comprises time-of-flight sensor, LiDAR, or IMU, etc. Another possibility is that in addition to use the trajectory shape, recorded images can also be used for the localization of the trajectory T in a construction model 15. Images correspondences between the current trajectory T and previously recorded documentation data can provide additional hints or constraints for a (final) alignment or scaling or alignment/scaling refinement or correction.

Figures 3, 4:
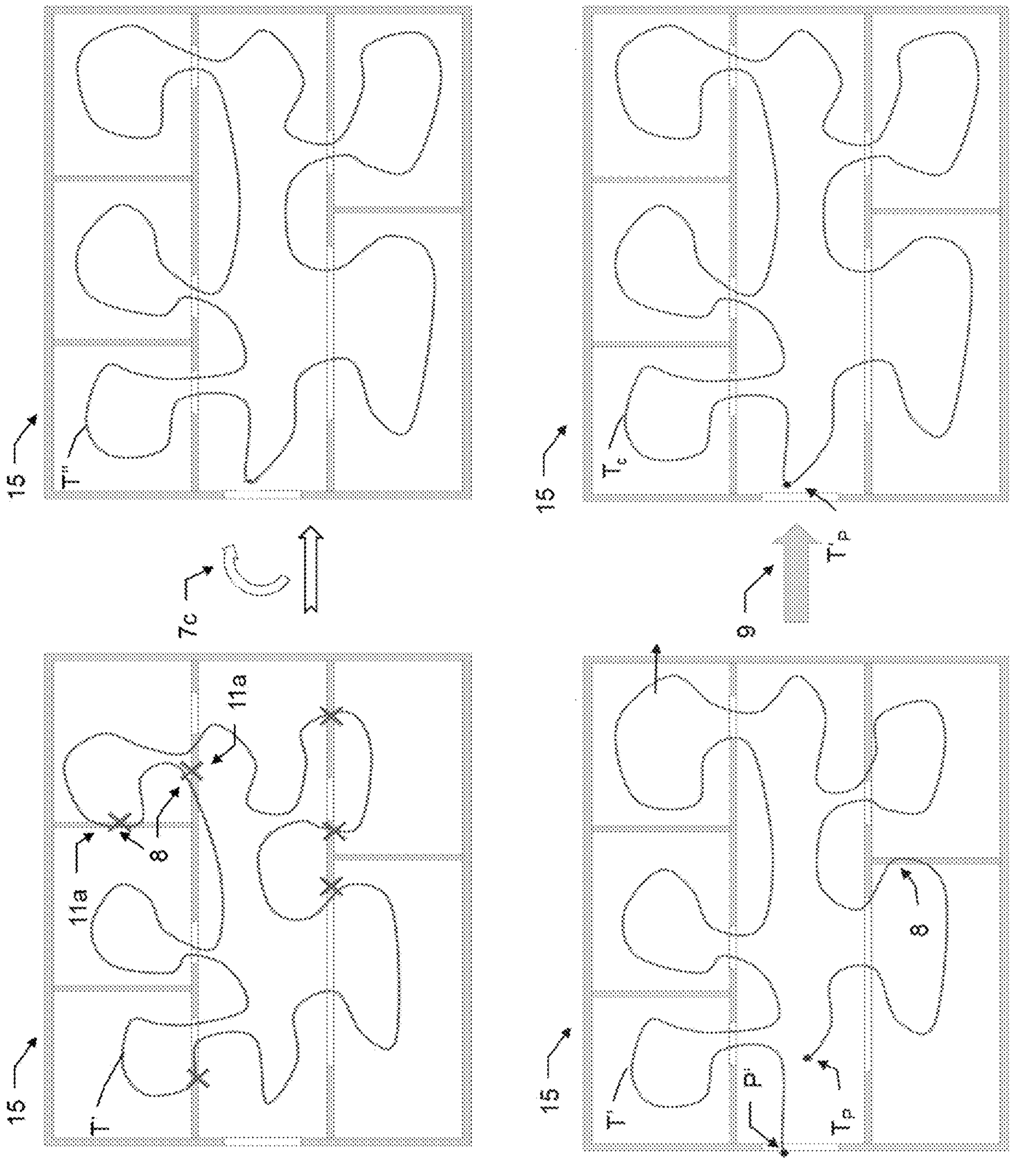
FIG. 3 schematically depicts an example of a trajectory alignment or scale correction.
FIG. 4 schematically depicts another example of a trajectory alignment or scale correction.

FIG. 3 shows an example of a trajectory alignment/scale correction or verification.

On the left side of the figure, a trajectory T' aligned and scaled to a construction plan 15 based on attribute correlation as described in context of FIGS. 2*a,b* is shown. The resulting fitting of the trajectory T' is verified with regard to one or more minimal test criteria which have to be fulfilled or respected e.g., a constraint which reflects impossible or unlikely trajectory positions in view of the construction model 15.

In the example, it is tested if the aligned and scaled trajectory T' avoids path obstacles. In other words, a trajectory T' should not streak or touch any path obstacles such as walls 11*a* (or should have a minimal distance to such model attributes). As depicted, this is the case at trajectory positions 8 where the trajectory T' crosses or intrudes into wall segment 11*a*.

Thereby, obstacles can be provided as an attribute class (hence, the applied constraint is for example linked to a class "wall").

Such verification can be applied in that the aligned trajectory T' is placed in the construction model 15 and is controlled using e.g., signed distance fields, thereby for example avoiding crossing of trajectory segments and walls 11*a* in the floorplan 15.

Then, in order to remedy deficiencies such as obstacle crossing, a (further) shift, rotation or scaling of the trajectory T' is enacted, symbolized in the figure by arrows 7*c*, in such a way that a corrected trajectory T" results with having a minimal distance to all obstacle attributes 11*a* at every trajectory point or section.

Such a trajectory correction, verification of position criteria or consideration of constraints need not to be a separate or subsequent step after a first alignment and scaling, but can also be an integral part of an "over-all" attribute based alignment and scaling procedure.

In particular if multiple constraints of different type are considered, they can be weighted. For instance, a weighting can depend on association of a constraint to a class or attribute, e.g., in that a constraint which refers to one class of attributes is given more weight than another constraint which is connected to another attribute class. Also, a weighting dependent on time or "rank" in the trajectory sequence can be applied, e.g., giving constraints at "earlier" trajectory sections less weight or less correction impact than at "later" trajectory parts, as further exemplified in the following, too.

FIG. 4 shows another example of a trajectory alignment/scale correction or verification.

In the example like in the previous one of FIG. 3, again part of the aligned trajectory T' hits or crosses wall segments at positions 8, in this example particularly at trajectory areas towards the end of the trajectory T'. Further, the trajectory's end point TP is far away from the start point P' which in this example does not reflect the actual walk-through path which is more or less a closed loop as a trajectory constraint.

Such trajectory defects can result from accumulated errors of position or motion sensing which is for instance the case when using an IMU resp. determining positions according to the principle of dead reckoning.

To correct such time-dependent trajectory defects, for instance to compensate drift of a visual-odometry or SLAM-based trajectory T', the shape or course of the trajectory T' can be adjusted as well during an alignment process.

In the example, not only trajectory sections 8 hitting a wall are corrected but also the positions of end point Tp and connected points of the end part of the trajectory T'. For instance, the end point Tp and therewith the appended trajectory section is shifted to overlay with the start point P'.

As such end points $T_P$ are considered less reliable compared to earlier trajectory or inspection points, they are repositioned to a larger extend than earlier ones. Hence, time is considered in the editing of a trajectory in that a time dependent weighting is applied where later determined positions are given less weight and are more prone to be shifted/corrected.

Also for example, a graph based optimization can be formulated where constraints from the trajectory shape are properly weighted against trajectory pattern constraints.

A time dependent weighting, e.g., using time stamps, can not only be applied for a trajectory point and/or segment and not only in a correction step, but also for attribute extraction. As another example, also first attributes can be weighted, for example in that "later" attributes (attributes associated with a later point of time or posterior part of the trajectory) are weighted less for alignment or scaling.

A skilled person is aware of the fact that details, which are here shown and explained with respect to different embodiments, can also be combined with details from other embodiments and in other permutations.

The invention claimed is:

1. A method for localizing inspection data sets of a construction within a construction plan or model, the method comprising:

moving an electronic inspection device at the construction while capturing multiple inspection data sets of at least part of the construction by opto-electronic inspection means of the electronic inspection device;

automatically recording a movement trajectory of the electronic inspection device in an internal reference system of the electronic inspection device based on motion and/or location data gathered on board the electronic inspection device while moving;

allocating respective captured inspection data sets to respective positions of the movement trajectory;

automatically determining, by means of a first machine-learned algorithm, first attributes of the movement trajectory based on a shape and/or motion of sections of the movement trajectory;

automatically extracting or providing second attributes from the construction plan or model, wherein the second attributes comprise geometric construction attributes of the construction plan or model;

automatically determining correspondences between the first attributes and the second attributes;

automatically determining and applying, based on the determined correspondences, a geometric transformation for aligning the movement trajectory with the construction plan or model, thereby changing the movement trajectory from the internal reference system of the electronic inspection device into a coordinate system of the construction plan or model; and automatically allocating the inspection data sets to positions within the construction plan or model based on the changed movement trajectory.

2. The method according to claim 1, wherein allocating respective captured inspection data sets to respective positions of the movement trajectory is based on time stamps.

3. The method according to claim 2, further comprising weighting a first attribute and/or a movement trajectory point and/or segment depending on an associated time stamp.

4. The method according to claim 1, wherein first attributes are determined according to pre-determined different classes of movement trajectory shape sections and/or movement trajectory motion sections.

5. The method according to claim 1, wherein second attributes comprise different classes of construction sections, therein at least one of:

classes of spaces, classes of locations and/or dimensions of barriers, and/or classes of openings.

6. The method according to claim 1, further comprising automatically correcting the movement trajectory by adding, cutting and/or shifting movement trajectory points and/or segments based on constraints derived from the movement trajectory and/or construction model or plan.

7. The method according to claim 6, wherein constraints are linked to attributes.

8. The method according to claim 7, wherein first attributes are determined according to pre-determined different classes of movement trajectory shape sections and/or movement trajectory motion sections, further comprising weighting of constraints depending on an attribute class.

9. The method according to claim 7, wherein second attributes comprise different classes of construction sections, therein at least one of:

classes of spaces, classes of locations and/or dimensions of barriers, and/or classes of openings, further comprising weighting of constraints depending on an attribute class.

10. The method according to claim 1, wherein attributes comprise:

patterns of shapes and/or motion patterns, patterns of construction site sections, and/or a graph representation.

11. The method according to claim 10, wherein first attributes are determined according to pre-determined different classes of movement trajectory shape sections and/or movement trajectory motion sections and wherein second attributes comprise different classes of construction sections, therein at least one of:

classes of spaces, classes of locations and/or dimensions of barriers, and/or classes of openings, and wherein patterns are derived from an association to a respective class.

12. The method according to claim 1, wherein for determining and applying the geometric transformation, there is consideration of:

the motion and/or location data of the inspection device and/or a previous inspection documentation movement trajectory of the construction and/or at least one previous image of the construction from a previous inspection documentation.

13. The method according to claim 1, wherein the first attributes are determined using a first neural network.

14. The method according to claim 1, wherein the second attributes are extracted from the construction plan or model using a second machine-learned algorithm.

15. The method according to claim 14, wherein the second attributes are extracted from the construction plan or model using a second neural network.

16. The method according to claim 1, further comprising determining first attributes based on a 2D-planar presentation of the movement trajectory.

17. The method according to claim 1, wherein the inspection device comprises an opto-electronic 2D- and/or 3D-imaging device and the data sets comprise 2D- and/or 3D-images.

18. The method according to claim 17, wherein the motion and/or location data comprises at least part of the images.

19. A construction inspection system for localizing inspection data sets of a construction within a construction plan or model, the system comprising:

a movable electronic inspection device having:

motion and/or location detection means for recording a movement trajectory of the electronic inspection device in an internal reference system of the electronic inspection device and opto-electronic inspection means, sensors or detectors for capturing inspection data sets of at least part of the construction along the movement trajectory and an evaluation unit configured to allocate a respective captured data set to a position of the movement trajectory, wherein the evaluation unit is configured to:

determine, by means of a first machine-learned algorithm, first attributes of the movement trajectory based on a shape and/or motion of sections of the movement trajectory, extract or provide second attributes from the construction plan or model, wherein the second attributes comprise geometric construction attributes of the construction plan or model, determine correspondences between the first attributes and the second attributes, determine and apply, based on the determined correspondences, a geometric transformation for aligning the movement trajectory with the construction plan or model, thereby changing the movement trajectory from the internal reference system of the electronic inspection device into a coordinate system of the construction plan or model, allocate the inspection data sets to positions within the construction plan or model based on the changed movement trajectory.

20. A computer program product comprising program code which is stored on a non-transitory machine-readable medium, and having computer-executable instructions for performing, when executed on an evaluation unit of a system, the method according to claim 1.

* * * * *